(12) United States Patent
Murai et al.

(10) Patent No.: US 10,300,667 B2
(45) Date of Patent: May 28, 2019

(54) MOLDING DIE AND METHOD FOR MOLDING COMPOSITE MATERIAL

(71) Applicant: MITSUBISHI HEAVY INDUSTRIES, LTD., Minato-ku, Tokyo (JP)

(72) Inventors: Tomohiro Murai, Tokyo (JP); Masaaki Nishiguchi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 546 days.

(21) Appl. No.: 14/899,544

(22) PCT Filed: Jun. 17, 2014

(86) PCT No.: PCT/JP2014/066034
§ 371 (c)(1),
(2) Date: Dec. 17, 2015

(87) PCT Pub. No.: WO2014/203893
PCT Pub. Date: Dec. 24, 2014

(65) Prior Publication Data
US 2016/0136904 A1 May 19, 2016

(30) Foreign Application Priority Data
Jun. 18, 2013 (JP) ................................ 2013-127995

(51) Int. Cl.
*B29C 70/54* (2006.01)
*B29C 70/30* (2006.01)
(Continued)

(52) U.S. Cl.
CPC ............ *B29C 70/54* (2013.01); *B29C 33/308* (2013.01); *B29C 70/30* (2013.01); *B29C 70/541* (2013.01);
(Continued)

(58) Field of Classification Search
CPC ....................................................... B29C 70/54
See application file for complete search history.

(56) References Cited

U.S. PATENT DOCUMENTS 3,087,207 A   4/1963  Styra
4,255,221 A   3/1981  Young
(Continued)

FOREIGN PATENT DOCUMENTS

CN   1982040 A     6/2007
CN   101590698 A   12/2009
(Continued)

OTHER PUBLICATIONS

Lu Zuochen, "Cruise missile launcher (2)", China Aerospace Publishing House, Feb. 29, 1996, pp. 207-208.
(Continued)

*Primary Examiner* — Larry W Thrower
(74) *Attorney, Agent, or Firm* — Hauptman Ham, LLP (57) ABSTRACT

This molding die used for molding a composite material comprises: a molding member having a molding surface; a support frame that is provided on the lower side of the molding member, and that supports the molding member; and a height adjustment mechanism that is provided between the molding member and the support frame, and that is capable of adjusting the height of the molding member with respect to the support frame. The thermal expansion coefficient of the molding member is less than or equal to the thermal expansion coefficient of the support frame. Three wheels that travel on a floor surface while supporting the support frame at three points are provided on the lower side of the support frame.

4 Claims, 6 Drawing Sheets

(51) Int. Cl.
　　*B29C 33/30* (2006.01)
　　*B29K 105/08* (2006.01)
　　*B29L 31/30* (2006.01)
(52) U.S. Cl.
　　CPC ................ *B29K 2105/0872* (2013.01); *B29L 2031/3076* (2013.01)

(56) References Cited

U.S. PATENT DOCUMENTS

| 8,057,206 B1 | 11/2011 | McKnight |
| 2007/0107189 A1 | 5/2007 | Prichard et al. |
| 2008/0245468 A1 | 10/2008 | Kato |

FOREIGN PATENT DOCUMENTS

| GB | 2268699 A | 1/1994 |
| JP | 1-316139 A | 12/1989 |
| JP | 3025966 U | 6/1996 |
| JP | 9-277385 A | 10/1997 |
| JP | 2004-181758 A | 7/2004 |
| JP | 2007-125890 A | 5/2007 |
| JP | 2008-143480 A | 6/2008 |
| WO | 87/07233 A1 | 12/1987 |
| WO | 2012/093136 A2 | 7/2012 |

OTHER PUBLICATIONS

Office Action in CN Application No. 201480034551.8, dated Aug. 18, 2016.
Written Opinion dated Sep. 22, 2014, corresponding to International Patent Application No. PCT/JP2014/066034.
Extended European Search Report in EP Application No. 14813993.4 dated Feb. 23, 2017.
Decision to Grant a Patent in JP Application No. 2013-127995 dated Jan. 31, 2017.
International Search Report dated Sep. 22, 2014, corresponding to International Application No. PCT/JP2014/066034.

MOLDING DIE AND METHOD FOR MOLDING COMPOSITE MATERIAL

RELATED APPLICATIONS

The present application is a National Phase entry of International Application No. PCT/JP2014/066034, filed Jun. 17, 2014, which claims priority of Japanese Application No. 2013-127995, filed Jun. 18, 2013.

TECHNICAL FIELD

The present invention relates to a molding die used for molding a composite material and a method for molding a composite material.

BACKGROUND ART

In the related art, although not a molding die for a composite material, assembly jigs for structural components made from composite materials are known (for example, refer to Patent Document 1). The assembly jig for structural components made from composite materials is provided with a jig structure, a pilot plate provided on an top surface side of the jig structure, a slide mechanism provided between the jig structure and the pilot plate, and a fitting and a locator provided between the pilot plate and the structural component made from a composite material. The locator is a member for adjusting the position at which a structural component made from a composite material is horizontally supported in the up and down direction.

CITATION LIST

Patent Literature

Patent Document 1: Japanese Unexamined Patent Application Publication No. H01-316139A

SUMMARY OF INVENTION

Technical Problem

Here, the top surface of a molding die used for molding a composite material is a molding surface. In order to favorably mold the composite material, for the molding die, it is preferable to use a material with a low thermal expansion to suppress deformation of the molding surface due to heat. As the material with a low thermal expansion, for example, a low-expansion alloy such as Invar is used. In addition, the molding die may be provided with wheels in order to freely move. In this case, there is a possibility that the molding die supported on wheels will sag under its own weight with the wheels as support points. For this reason, increasing the thickness of the molding die and increasing the rigidity of the molding die may be considered in order to suppress deformation of the molding surface caused by the molding die sagging under its own weight. However, in a case where the thickness of the molding die is increased, when Invar is used as the material of the molding die, the manufacturing costs of the molding die are increased since Invar is an expensive material. Here, Patent Document 1 describes a configuration in which a structural component made from a composite material is supported by a locator, which is not a configuration for supporting a molding die which has a molding surface.

Therefore, an object of the present invention is to provide a molding die which can be an inexpensive structure while suppressing deformation of a molding surface, and a method for molding a composite material.

Solution to Problem

A molding die of the present invention is a molding die used for molding a composite material. The molding die includes a molding member having a molding surface, a support frame provided on a lower side of the molding member and configured to support the molding member, and a height adjustment mechanism provided between the molding member and the support frame and capable of adjusting the height of the molding member with respect to the support frame.

According to this configuration, even in a case where the support frame sags under its own weight or a case where the support frame is deformed by welding, the molding member can be brought into a level state by adjusting the height thereof using the height adjustment mechanism Here, in addition to a horizontal state which is a state parallel to the horizontal surface, the level state includes an inclined state which is a state parallel to a flat inclined surface inclined with respect to the horizontal surface. In addition, the height adjustment mechanism is capable of supporting the molding member 6 such that the molding member 6 is brought into a level state, which eliminates the need for an increase in the thickness of the molding member. This makes it possible to make the molding die to be an inexpensive structure while suppressing deformation of the molding surface.

In addition, it is preferable that the thermal expansion coefficient of the molding member is less than or equal to the thermal expansion coefficient of the support frame.

According to this configuration, it is possible for the thermal expansion coefficient of the molding member to be lower, which makes it possible to suppress thermal deformation of the molding surface. As the material to be used in the molding member, it is possible to use a composite material such as CFRP, or a steel material in addition to Invar.

In addition, it is preferable to provide three wheels provided on the lower side of the support frame and configured to travel on a floor surface while supporting the support frame at three points.

According to this configuration, the support frame can be moved while being supported at three points. Accordingly, since the support frame can be moved in a state where all the three wheels are grounded even if the floor surface is uneven, twisting is not generated in the support frame. Thus, the support frame can be moved while suppressing deformation of the molding surface caused by twisting in the support frame.

In addition, the height adjustment mechanism preferably includes a nut configured to be fixed to the support frame, a screw shaft configured to be screwed into the nut at its lower end and to be rotated to move in the height direction with respect to the nut, and a contact member provided on the upper end of the screw shaft and configured to come into contact with the molding member.

According to this configuration, it is possible to manually adjust the height of the molding member coming into contact with the contact member by rotating the screw shaft to move the screw shaft in the height direction with respect to the nut. This makes it possible to easily and manually adjust the height using the height adjustment mechanism.

In addition, the height adjustment mechanism is preferably attached to the support frame and includes a container configured to store a fluid therein, a floating body configured to float on the fluid stored in the container, and a contact member connected to the floating body and coming into contact with the molding member.

According to this configuration, since the interface (top surface) of the fluid in the container is a horizontal surface and the floating body floats on the fluid which has the horizontal surface, the molding member coming into contact with the contact member can be brought into a horizontal state. For this reason, since the interface of the fluid is the horizontal plane even in a case where the support frame sags, the molding member can be brought into a horizontal state.

In addition, the molding die is preferably further provided with a horizontal level detector configured to detect a horizontal level of the height adjustment mechanism, and a control unit capable of controlling the height of the height adjustment mechanism. The height adjustment mechanism preferably includes an actuator attached to the support frame at its base end, and a contact member provided on the leading end of the actuator and coming into contact with the molding member. The control unit is preferably connected to the actuator and is configured to perform driving control of the actuator on the basis of a detection result of the horizontal level detector to adjust the height of the molding member with respect to the support frame.

According to this configuration, it is possible to maintain the horizontal level of the height adjustment mechanism using the control unit. For this reason, even in a case where the support frame is distorted, the control unit can adjust the height of the height adjustment mechanism to follow the distortion of the support frame by performing driving control of the actuator, which makes it possible to bring the molding member into a horizontal state.

The molding die is preferably further provided with a guide member placed on the molding surface and extending in the longitudinal direction. The guide member preferably includes a plurality of slits formed to be spaced at predetermined intervals in the longitudinal direction and to extend in an orthogonal direction orthogonal to the longitudinal direction, and a pin hole for fixing the guide member corresponding to the molding surface.

According to this configuration, forming the plurality of slits makes it possible to deform the guide member so as to correspond to the molding surface and, in addition, to fix the guide member, which is deformed so as to correspond to the molding surface, to the molding surface using the pin hole.

A method for molding a composite material of the present invention is a method for molding a composite material using a molding die. The molding die is provided with a molding member having a molding surface, a support frame provided on the lower side of the molding member and supporting the molding member, a height adjustment mechanism provided between the molding member and the support frame and capable of adjusting the height of the molding member with respect to the support frame, and three wheels provided on the lower side of the support frame and configured to travel on a floor surface while supporting the support frame at three points. In this method, the molding die is moved between a work area and a heating and molding area while traveling on the floor surface.

According to this configuration, it is possible to move the molding die between the work area and the heating and molding area while traveling on the floor surface. For this reason, it is not necessary to perform complicated movement operations such as lifting and moving the molding die using a crane, which makes it possible to shorten the operation time for the movement operation. This makes it possible to efficiently perform the molding work on the composite material.

DESCRIPTION OF EMBODIMENTS

Detailed description will be given below of embodiments according to the present invention on the basis of the drawings. Note that the present invention is not limited by these embodiments. In addition, the constituent elements in the embodiments described below include those that can be easily replaced by a person skilled in the art or those that are substantially the same.

Embodiment 1

Figure 1:
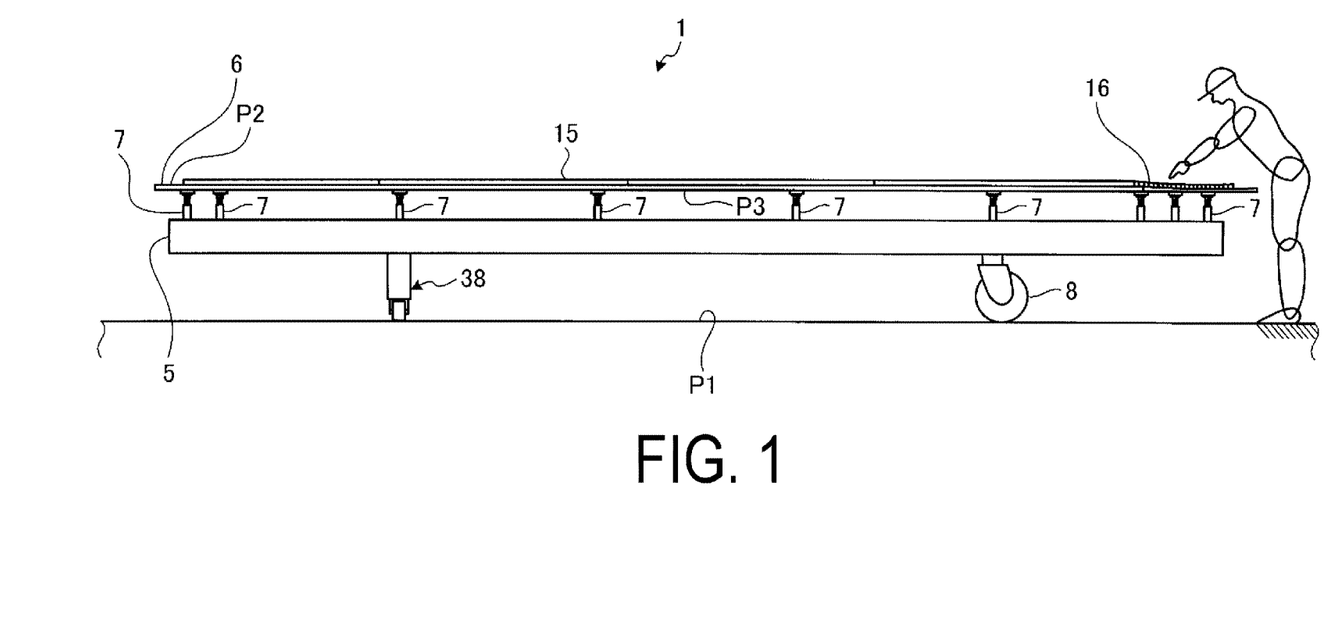
FIG. 1 is a side view of a molding die according to embodiment 1 viewed from the side.
Figure 2:
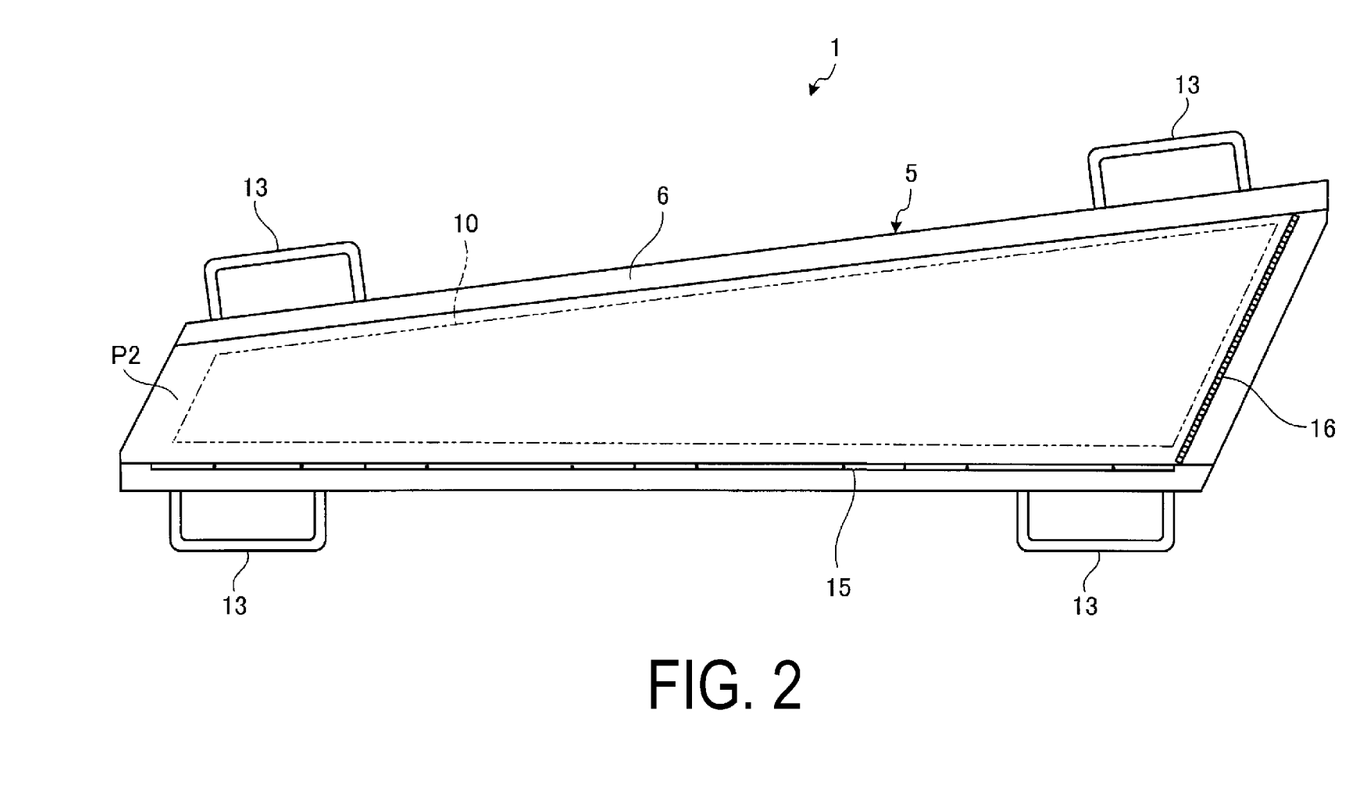
FIG. 2 is a plan view of the molding die according to embodiment 1 viewed from above.
Figure 3:
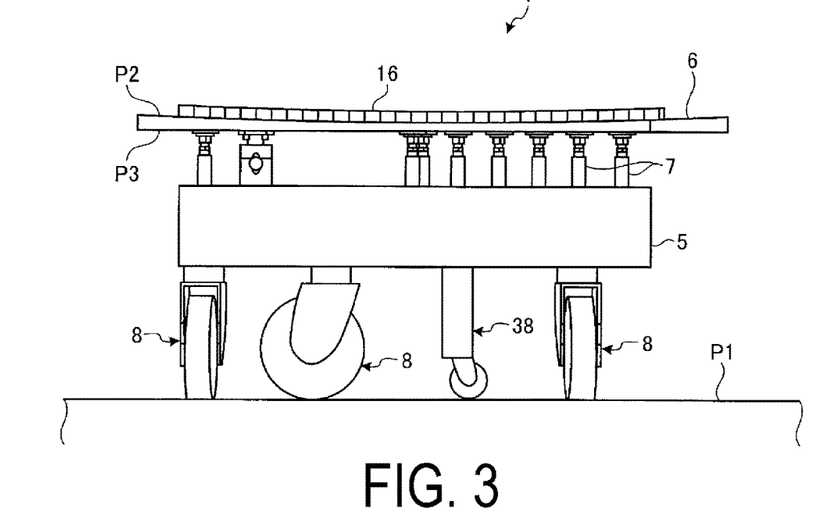
FIG. 3 is a front view of the molding die according to embodiment 1 viewed from the front.

FIG. 1 is a side view of a molding die according to embodiment 1 viewed from the side. FIG. 2 is a plan view of the molding die according to embodiment 1 viewed from above. FIG. 3 is a front view of the molding die according to embodiment 1 viewed from the front. A molding die 1 illustrated in FIG. 1 to FIG. 3 is a mold for molding a composite material. As a composite material, for example, carbon fiber reinforced plastic (CFRP) is used. Here, CFRP is used as the composite material in embodiment 1; however, the present invention is not limited to this configuration. The composite material may be of any type as long as resin and fiber are used.

The composite material (molded product) to be molded by the molding die 1 is, for example, used in a structure configuring at least a portion of a wing body such as a main wing or a tail of an aircraft. In embodiment 1, description will be given of the molding die which molds the tail of an aircraft. Here, description will be given in which the molding die 1 of embodiment 1 is used as a molding die which molds the tail of an aircraft; however, the present invention is not limited to this configuration. The molding die 1 may be used as a molding die which molds a main wing of an aircraft, may be used as a molding die which molds a structure other than that of an aircraft, and may be used as any molding die which molds a composite material.

As illustrated in FIG. 1, the molding die 1 of embodiment 1 is provided with a support frame 5, a molding member 6 provided above the support frame 5, a height adjustment mechanism 7 provided between the support frame 5 and the molding member 6, and three wheels 8 provided below the support frame 5. Although details will be described below, because this molding die 1 can travel on a floor surface P1 with the three wheels 8, the molding die 1 can move freely between a work area for performing work relating to the molding of composite materials and a heating and molding area for performing heating and molding.

The support frame 5 is formed of, for example, a steel material. The shape of the support frame 5 in plan view, viewed from the upper side, illustrated in FIG. 2 is a shape slightly larger than a tail 10 (the long dashed double-short dashed line in FIG. 2) to be molded and is a substantially quadrilateral shape. Handles 13 (illustrated only in FIG. 2) to be gripped when moving the molding die 1 are attached to the support frame 5. Four handles 13 are provided in embodiment 1 so as to be arranged at the respective four corners of the support frame 5 which has a quadrangular shape.

The molding member 6, which is formed of, for example, a low-expansion alloy material such as Invar, is provided to face the support frame 5. Since the molding member 6 is formed of a low-expansion alloy material, the molding member 6 has a thermal expansion coefficient lower than that of the support frame 5. In addition, the shape of the molding member 6 in plan view, viewed from the upper side, illustrated in FIG. 2 is a shape slightly larger than the tail 10 to be molded, in the same manner as the support frame 5. The molding member 6 has a thickness less than that of the support frame 5. The molding member 6 has a top surface corresponding to a molding surface P2 for molding the composite material, and the molding surface P2 has a shape corresponding to the shape of the molded product, which is the molded composite material. In the case of embodiment 1, the molding surface P2 has a shape corresponding to the skin (the outer plate) of the tail 10. Specifically, the molding surface P2 is formed into a curved surface which is downwardly convex when viewed from the plane of the short side of the tail 10. On the other hand, the molding member 6 has a bottom surface corresponding to a support surface P3 supported by the height adjustment mechanism 7. The support surface P3 is a flat surface.

Here, the molding member 6 described above is appropriately designed correspond to the shape of the tail 10 to be molded. For this reason, the shape of the molding surface P2 of the molding member 6 changes corresponding to the shape of the tail 10 to be designed. That is, the molding member 6 is prepared for the type of the tail 10 to be designed.

On the molding surface P2 of the molding member 6, a wing guide 15 arranged in the long side direction of the rear side (lower side in the diagram) of the tail 10 and a lay-up guide (guide member) 16 arranged in the short-side direction of a base end side (right side in the diagram) of the tail 10 are fixed. The wing guide 15 is formed in a linear shape extending in the long side direction and is fixed to a flat surface portion of the molding surface P2. The lay-up guide 16 is formed in a linear shape extending in the short-side direction and is flexible corresponding to the molding surface P2 which is a curved surface; thus the lay-up guide 16 is fixed on the curved surface portion of the molding surface P2.

Figure 4:
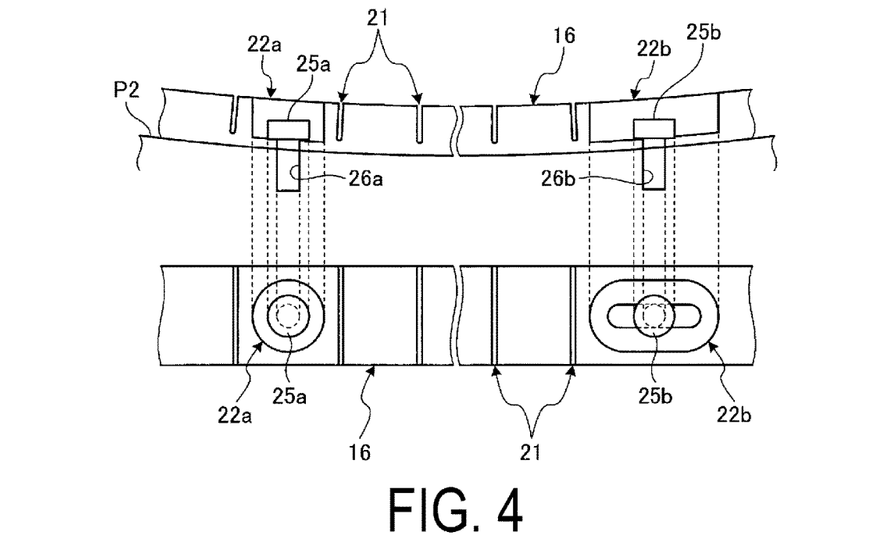
FIG. 4 is an explanatory diagram illustrating a lay-up guide of the molding die according to embodiment 1.

FIG. 4 is an explanatory diagram illustrating the lay-up guide of the molding die according to embodiment 1. The upper portion of FIG. 4 is a front view of the lay-up guide 16 viewed from the front, and the lower portion is a plan view of the lay-up guide 16 viewed from above. As illustrated in FIG. 4, the lay-up guide 16 is fixed on the molding surface P2 which is a curved surface; however, at this time, the lay-up guide 16 is flexible so as to correspond to the molding surfaces P2 of various types of the molding member 6. This lay-up guide 16 has a plurality of slits 21, and a pair of pin holes 22a and 22b.

The plurality of slits 21 are provided to be spaced at predetermined intervals in the longitudinal direction of the lay-up guide 16. Each of the slits 21 is formed to extend in an orthogonal direction, which is orthogonal to the longitudinal direction. In addition, each of the slits 21 is formed to extend from the top surface toward the bottom surface so that a portion on the bottom surface side is left. For this reason, the top surface side of the lay-up guide 16 is divided by the plurality of slits 21 while the bottom surface side has a continuous shape. Thus, the lay-up guide 16 may be flexible in a front view, viewed from the front, while maintaining a linear shape in a plan view, viewed from above.

Of the pair of pin holes 22a and 22b, the one pin hole 22a is formed in a circular shape, while the other pin hole 22b is formed in an oval shape. Here, the oval shape includes ovals, ellipses, rounded rectangles, and the like. The pin hole 22b has an oval shape that is longer in the longitudinal direction of the lay-up guide 16.

The pin hole 22a with a circular shape is a stepped pin hole 22a formed of a bottomed circular drilled hole formed to be sunk into the top surface of the lay-up guide 16 and a circular through-hole formed through the center of the bottom surface of the drilled hole. A positioning pin 25a is inserted into the pin hole 22a. While the shaft portion of the positioning pin 25a is inserted into the through-hole, the head portion thereof comes into contact with the bottom surface of the drilled hole. That is, the bottom surface of the drilled hole is a seat surface with which the head portion of the positioning pin 25a comes into contact. Then, the positioning pin 25a inserted into the pin hole 22a is inserted into a positioning hole 26a formed in the molding surface P2. Due to this, the positioning pin 25a vertically regulates the position of the lay-up guide 16.

In the same manner as the pin hole 22a, the pin hole 22b with an oval shape is a stepped pin hole 22b formed of a bottomed oval drilled hole formed to be sunk into the top surface of the lay-up guide 16 and an oval-shaped through-hole formed through the center of the bottom surface of the drilled hole. A positioning pin 25b is inserted into the pin hole 22b. While the shaft portion of the positioning pin 25b is inserted into the through-hole, the head portion thereof comes into contact with the bottom surface of the drilled hole. That is, the bottom surface of the drilled hole is a seat surface with which the head portion of the positioning pin 25b comes into contact. Then, the positioning pin 25b inserted into the pin hole 22b is inserted into a positioning hole 26b formed in the molding surface P2. At this time, since the pin hole 22b has an oval shape, the positioning pin 25b is inserted into the positioning hole 26b at a predetermined position in the longitudinal direction of the pin hole 22b.

Here, the positioning hole 26a and the positioning hole 26b are formed such that the depth direction thereof is a direction orthogonal with respect to the support surface P3 of the molding member 6 which is a flat surface. This makes it possible to machine the positioning hole 26a and the positioning hole 26b with a three-axis machining tool, allowing the positioning hole 26a and the positioning hole 26b to be formed at low cost. On the other hand, because the molding surface P2 of the molding member 6 has a curved surface, the depth direction of (the through-holes of) the pin holes 22a and 22b of the lay-up guide 16 which deforms so as to correspond to the molding surface P2 is slightly inclined with respect to the depth direction of the positioning hole 26a and the positioning hole 26b. At this time, the formation of the pin holes 22a and 22b as stepped fixing holes makes it possible to reduce the thickness between the bottom surface of the drilled holes and the bottom surface of the lay-up guide 16, allowing the length of the through-holes to be shortened. This allows the positioning pin 25a and the positioning pin 25b to be inserted into the positioning hole 26a and the positioning hole 26b without the insertion directions of the positioning pin 25a and the positioning pin 25b being regulated by the through-holes.

In a case where the lay-up guide 16 is fixed to the molding surface P2 as described above, the lay-up guide 16 is deformed so as to correspond to the molding surface P2 and the positioning pin 25a is inserted into the positioning hole 26a through the circular pin hole 22a and the positioning pin 25b is inserted into the positioning hole 26b through the oval pin hole 22b. At this time, since the pin hole 22b has an oval shape, the pin holes 22a and 22b of the lay-up guide 16 deformed so as to correspond to the molding surface P2 can be positioned over the positioning holes 26a and 26b. Thus, the lay-up guide 16 is suitably fixed so as to correspond to the molding surface P2 without floating with respect to the molding surface P2.

Here, in the present embodiment, the one pin hole 22a formed in the lay-up guide 16 has a circular shape and the other pin hole 22b has an oval shape; however, the pair of pin holes 22a and 22b may both have an oval shape.

The height adjustment mechanism 7 adjusts the distance between the support frame 5 and the molding member 6 in order to bring the molding member 6 into a level state. The height adjustment mechanism 7 uses a screw mechanism to allow its height to be manually adjusted. A plurality of the height adjustment mechanisms 7 are provided between the support frame 5 and the molding member 6. The plurality of the height adjustment mechanisms 7 are arranged to be able to support the molding member 6 such that the molding member 6 is brought into a level state. That is, the plurality of height adjustment mechanisms 7 are arranged such that the intervals between the adjacent height adjustment mechanisms 7 make it possible to support the molding member 6 in a level state. In addition, the plurality of height adjustment mechanisms 7 may be arranged in a grid manner or may be arranged in a staggered manner within the support surface P3. Here, in addition to a horizontal state which is a state parallel to the horizontal surface, the level state includes an inclined state which is a state parallel to a flat inclined surface inclined with respect to the horizontal surface. For this reason, the plurality of height adjustment mechanisms 7 support the molding member 6 in a horizontal state such that the support surface P3 of the molding member 6 is parallel to the horizontal surface. Here, the plurality of height adjustment mechanisms 7 may support the molding member 6 in an inclined state such that the support surface P3 of the molding member 6 is parallel to a flat inclined surface inclined with respect to the horizontal surface.

Figure 5:
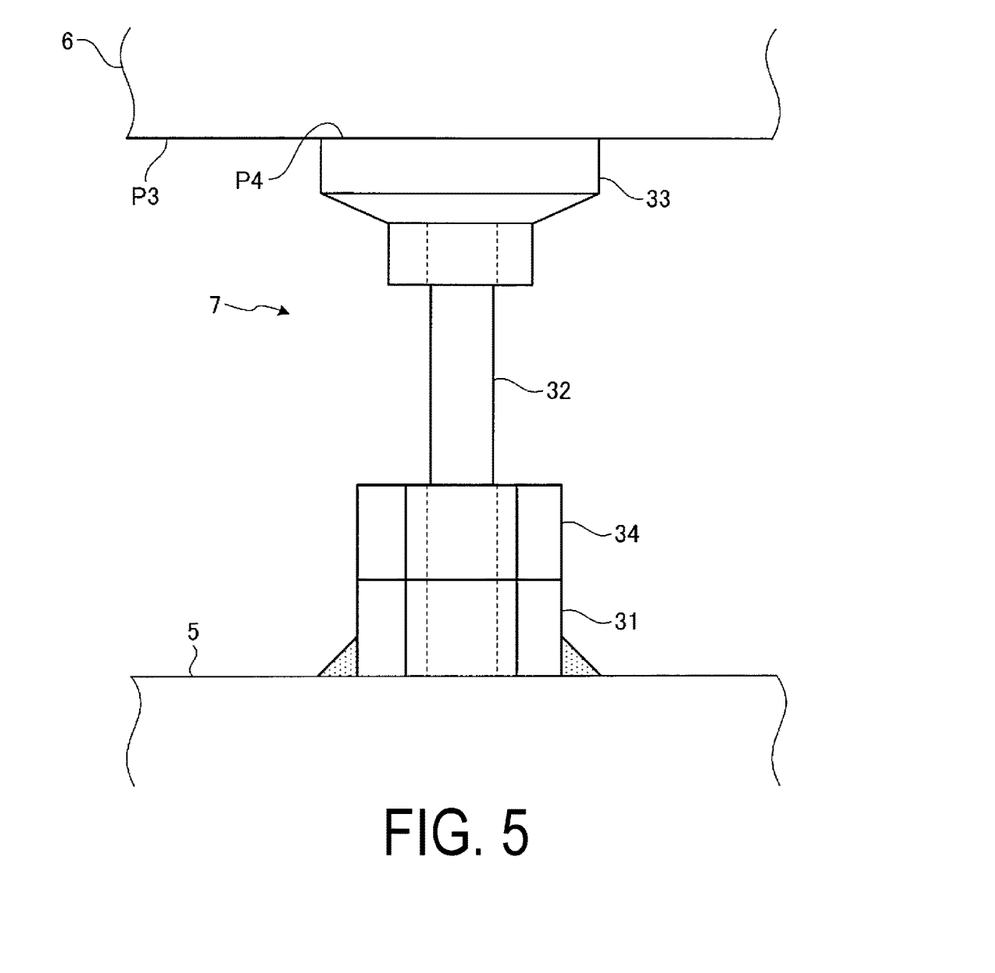
FIG. 5 is a schematic view illustrating a height adjustment mechanism of the molding die according to embodiment 1.

FIG. 5 is a schematic view illustrating a height adjustment mechanism of the molding die according to embodiment 1. As illustrated in FIG. 5, each of the height adjustment mechanisms 7 has a nut 31 fixed to the support frame 5, a screw shaft 32 fastened to the nut 31, a contact pad (a contact member) 33 coming into contact with the molding member 6, and a lock nut 34 provided between the nut 31 and the contact pad 33.

The nut 31 is fixed to the support frame 5 by welding. One end (the lower end) of the screw shaft 32 in the axial direction is fastened to the nut 31. Rotating, with respect to the nut 31, the screw shaft 32 fastened to the nut 31 allows the screw shaft 32 to move in the axial direction (height direction) thereof. The contact pad 33 is fixed to the other end (the upper end) in the axial direction of the screw shaft 32 and has a contact surface P4 coming into contact with the support surface P3 of the molding member 6. Here, the contact pad 33 may be configured such that the contact surface P4 is free to incline (free to swing) with respect to the screw shaft 32. The lock nut 34 is provided on the screw shaft 32 between the nut 31 and the contact pad 33 and the fastening of the nut 31 and the screw shaft 32 is strengthened by rotating the lock nut 34 to be fixed in contact with the nut 31. That is, the nut 31 and the lock nut 34 constitute a double nut.

Then, adjusting the height of each of the plurality of height adjustment mechanisms 7 makes it possible to set the support surface P3 of the molding member 6 placed on the contact surfaces P4 of the plurality of contact pads 33 to be a flat surface including a horizontal surface.

Again referring to FIG. 1 to FIG. 3, the three wheels 8 are attached to the lower side of the support frame 5 and support the support frame 5 at three points. For this reason, the three wheels 8 are all grounded on the floor surface P1. In addition, since the three wheels 8 support the support frame 5 at three points, even in a case of traveling on the floor surface P1 which is uneven, only the inclination of the support frame 5 changes, and twisting is not generated in the support frame 5. For this reason, since the molding member 6 can be maintained in a level state, it is possible to move the support frame 5 while suppressing deformation of the molding surface P2 caused by twisting of the support frame 5. In addition, an auxiliary wheel 38 for fall prevention is provided on the support frame 5 so as to slightly float with respect to the three wheels 8 which are grounded.

Next, description will be given of a method for adjusting the height of the molding die 1 in which the molding member 6 is brought into a level state (horizontal state) by adjusting the height adjustment mechanisms 7 of the molding die 1 described above. In the molding die 1, the heights of the plurality of height adjustment mechanisms 7 are individually adjusted in a state where the molding member 6 is not placed on the height adjustment mechanisms 7. At this time, the heights of the height adjustment mechanisms 7 are each adjusted using a level gauge (not illustrated). The height adjustment mechanisms 7 having their heights adjusted using the level gauge are set to heights which allow the molding member 6 to be supported in a horizontal state using the contact pads 33. Then, by placing the molding member 6 on the contact surfaces P4 of the contact pads 33 of the height adjustment mechanisms 7 having their heights adjusted, the molding member 6 is brought into a level state, that is, the support surface P3 of the molding member 6 is a flat surface. By the above, the work relating to the method for adjusting the height of the molding die 1 is finished. Here, even when the molding member 6 is placed on the contact pads 33 after adjusting the heights of the height adjustment mechanisms 7, the support frame 5 has rigidity so as to prevent distortion due to the weight of the molding member 6. That is, in the design phase, the rigidity of the support frame 5 is designed such that the support frame 5 does not sag in consideration of, for example, the weight of the wing body of the tail 10 placed on the molding surface P2 of the molding member 6 in addition to the weight of the molding member 6.

Figure 6:
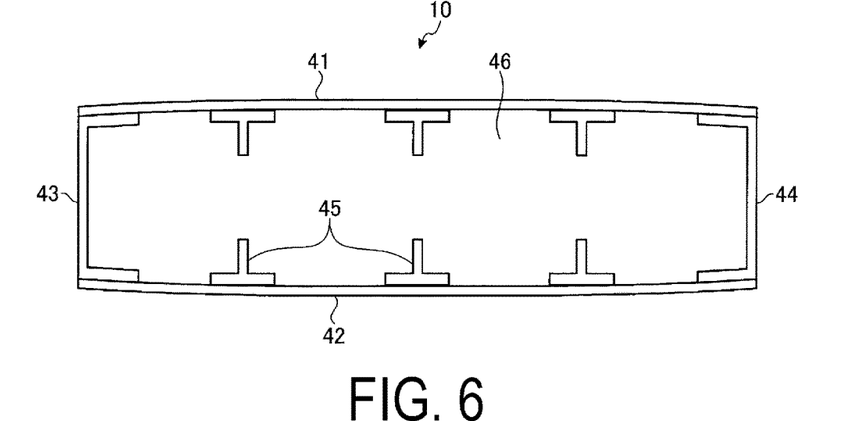
FIG. 6 is a cross-sectional view illustrating an example of a wing body structure to be molded using the molding die.

Next, description will be given of a work process for molding the tail 10 using the molding die 1. FIG. 6 is a cross-sectional view illustrating an example of a wing body structure to be molded using the molding die. Here, description will be given of the tail 10 prior to the description of the molding work of the tail 10. The tail 10 has a box-beam structure and is provided with an upper skin 41, a lower skin 42, a front spar 43, a rear spar 44, a plurality of stringers 45, and a plurality of ribs 46.

The upper skin 41 is an outer plate on the upper side of the tail 10. The lower skin 42 is an outer plate on the lower side of the tail 10 and is arranged to face the upper skin 41. The front spar 43 is a beam provided between the upper skin 41 and the lower skin 42 and is arranged in the longitudinal direction of the tail 10 on the front side of the tail 10. The rear spar 44 is a beam provided between the upper skin 41 and the lower skin 42 and is arranged in the longitudinal direction of the tail 10 on the rear side of the tail 10. The plurality of stringers 45 are longitudinal members formed with a T-shaped cross-section, provided on the inner sides of both the upper skin 41 and the lower skin 42, and arranged in the longitudinal direction of the tail 10. The plurality of ribs 46 are frame members arranged to be spaced at predetermined intervals in the longitudinal direction of the tail 10.

In the tail 10 configured as described above, a portion of the structure, for example, a co-bonded molded product formed of the skins 41 and 42, and the stringers 45, is molded by vacuum assisted resin transfer molding using the molding die 1 described above. In a case of forming the structure of a portion of the tail 10, firstly, the molding die 1 is moved toward a predetermined work area in which a releasing agent is coated on the molding surface P2 while the three wheels 8 travel on the floor surface P1. After the molding die 1 is moved to the predetermined work area, the releasing agent is coated on the molding surface P2 of the molding die 1. After coating the releasing agent, the molding die 1 is moved toward a predetermined work area in which base material sheets (dry preforms) formed of carbon fiber are laminated while the three wheels 8 travel on the floor surface P1.

After the molding die 1 is moved to the predetermined work area, a plurality of the dry preforms cut to the shape of the upper skin 41 or the lower skin 42 of the tail 10 are laminated with different fiber directions on the molding surface P2 of the molding die 1. At this time, the dry preforms are laminated while being positioned using the wing guide 15 and the lay-up guide 16 provided on the molding surface P2. After laminating the dry preforms, the molding die 1 is moved toward a predetermined work area in which a resin is impregnated into the dry preforms while the three wheels 8 travel on the floor surface P1. Here, a thermosetting resin is used as the resin.

After the molding die 1 is moved to the predetermined work area, the dry preforms laminated on the molding surface P2 of the molding die 1 are covered with a covering material, and a resin is impregnated into the dry preforms by injecting the resin while carrying out vacuum suction on the interior of the covering material. After impregnating the resin, the molding die 1 is moved toward a heating and molding area in which the resin is heated and cured while the three wheels 8 travel on the floor surface P1. Here, the impregnation of the resin may be performed in the heating and molding area.

The heating and molding area is formed in the interior of a heating apparatus. After the molding die 1 is moved to the heating and molding area, the molding die 1 is heated to a predetermined temperature (for example, to approximately 130° C.) by the heating apparatus. This allows the resin with which the dry preforms have been impregnated to be thermally cured, molding the dry preforms into the shape of the upper skin 41 or the lower skin 42. After the heating and molding, the molding die 1 is moved toward a predetermined work area, in which dry preform stringers 45 are placed on the top surface which is the inner side of the molded upper skin 41 or the lower skin 42, while the three wheels 8 travel on the floor surface P1.

After the molding die 1 is moved to the predetermined work area, the dry preform stringers 45 are placed at predetermined positions on the top surface of the upper skin 41 or the lower skin 42 molded by the molding die 1. After placing the stringers 45, the molding die 1 is moved toward a predetermined work area in which the resin is impregnated into the dry preform stringers 45 while the three wheels 8 travel on the floor surface P1.

After the molding die 1 is moved to the predetermined work area, the stringers 45 placed on the top surface of the upper skin 41 or the lower skin 42 are covered with a covering material, and a resin is impregnated by injecting the resin while carrying out vacuum suction on the interior of the covering material. After impregnating the resin, the molding die 1 is moved toward the heating and molding area in which the resin is heated and cured while the three wheels 8 travel on the floor surface P1.

After the molding die 1 is moved to the heating and molding area, the molding die 1 is heated to a predetermined temperature (for example, to approximately 80° C. to approximately 130° C.) by the heating apparatus. This allows the resin with which the dry preform stringers 45 have been impregnated to be thermally cured, molding the stringers 45 on the top surface of the upper skin 41 or the lower skin 42. After the heating and molding, the molding die 1 is moved toward a predetermined work area in which a co-bonded molded product formed of the upper skin 41 or the lower skin 42, and the stringers 45 is released from the molding die 1 while the three wheels 8 travel on the floor surface P1.

After moving the molding die 1 to the predetermined work area, the co-bonded molded product molded on the molding surface P2 of the molding die 1 is released from the molding die 1. After performing a predetermined inspection on the released co-bonded molded product which is a portion of the tail 10, the molded product is appropriately connected with other molded products forming the tail 10, which forms the tail 10.

As described above, according to the configuration of embodiment 1, even in a case where the support frame 5 sags under its own weight or a case where the support frame 5 is deformed by welding, the molding member 6 can be brought into a level state by adjusting the height thereof using the height adjustment mechanisms 7. In addition, since the height adjustment mechanism 7 is capable of supporting the molding member 6 such that the molding member 6 is brought into a level state, it is not necessary to increase the thickness of the molding member 6. This makes it possible to make the molding die 1 to be an inexpensive structure while suppressing deformation of the molding surface P2 of the molding member 6.

In addition, according to the configuration of embodiment 1, it is possible for the thermal expansion coefficient of the molding member 6 to be lower than the thermal expansion coefficient of the support frame 5, which makes it possible to suppress thermal deformation of the molding surface P2. Here, in the configuration of embodiment 1, the support frame 5 is a steel material and the molding member 6 is a low-expansion alloy such as Invar; however, the present invention is not limited to this configuration. Since it is sufficient if the thermal expansion coefficient of the molding member 6 is less than or equal to the thermal expansion coefficient of the support frame 5, the molding member 6 may use, for example, a composite material such as CFRP or a steel material similar to that of the support frame 5 in addition to Invar.

In addition, according to the configuration of embodiment 1, the support frame 5 can be moved while being supported at three points using the three wheels 8. At this time, since the support frame 5 can move in a state where all the three wheels 8 are grounded, even in a case of traveling on the floor surface P1 which is uneven, only the inclination of the support frame changes, and distortion such as twisting is not generated in the support frame 5. From the above, the support frame 5 can be moved while the molding member 6 is in a level state.

In addition, according to the configuration of embodiment 1, it is possible to manually adjust the height of the molding member 6 coming into contact with the contact pads 33 by rotating the screw shaft 32 to move the screw shaft 32 in the height direction with respect to the nut 31. This makes it possible to easily and manually adjust the height using the height adjustment mechanisms 7.

In addition, according to the configuration of embodiment 1, the formation of the plurality of slits 21 in the lay-up guide 16 makes it possible to deform the lay-up guide 16 so as to correspond to the molding surface P2. In addition, the formation of the pair of pin holes 22a and 22b in the lay-up guide 16 makes it possible to appropriately fix the lay-up guide 16, which has been deformed so as to correspond to the molding surface P2, to the molding surface P2 using the positioning pins 25a and 25b via the pin holes 22a and 22b.

In addition, according to the configuration of embodiment 1, it is possible to move the molding die 1 between the work area and the heating and molding area while traveling on the floor surface P1. For this reason, it is not necessary to perform complicated movement operations such as lifting and moving the molding die 1 using a crane, which makes it possible to shorten the operation time for the movement operation. This makes it possible to efficiently perform the molding work on the composite material.

Second Embodiment

Figure 7:
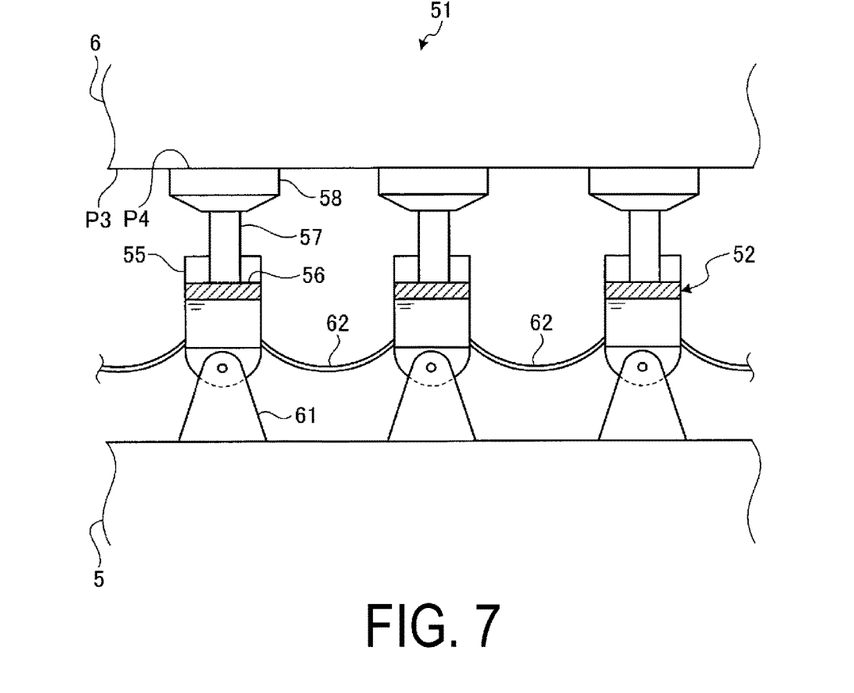
FIG. 7 is a schematic view illustrating a height adjustment mechanism of a molding die according to embodiment 2.

Next, description will be given of a molding die 51 according to embodiment 2 with reference to FIG. 7. FIG. 7 is a schematic view illustrating a height adjustment mechanism of a molding die according to embodiment 2. Here, in order to avoid repeating the description in embodiment 1, description will be given only of portions different from embodiment 1 and the same reference numerals will be used for the description of the same portions as embodiment 1. In embodiment 1, a screw mechanism is used as the height adjustment mechanism 7; however, in embodiment 2, a mechanism utilizing a fluid is used as a height adjustment mechanism 52.

As illustrated in FIG. 7, a plurality of the height adjustment mechanisms 52 are provided between the support frame 5 and the molding member 6. The plurality of height adjustment mechanisms 52 are arranged to be able to support the molding member 6 in the same manner as in embodiment 1.

Each of the height adjustment mechanisms 52 includes a container 55, a float (floating body) 56, a linking shaft 57, and a contact pad (a contact member) 58. The container 55 is formed in a bottomed cylindrical shape which is open at the top and stores a fluid therein. Here, for example, hydraulic oil is used as the fluid; however, any fluid may be used as long as the fluid is capable of forming a horizontal surface and of floating the float 56, without being limited to the hydraulic oil. The bottom side of the container 55 is fixed to the support frame 5 via a supporting member 61. The float 56, which is accommodated in the container 55, is capable of floating on the fluid and of moving in the height direction with respect to the container 55. At this time, the structure between the container 55 and the float 56 is sealed to suppress the fluid in the container 55 from leaking to the outside. For example, a sealing member such as an O ring is provided between the container 55 and the float 56. One end of the linking shaft 57 in the axial direction is fixed on the top surface of the float 56. The contact pad 58 is fixed to the other end in the axial direction of the linking shaft 57 and has a contact surface P4 coming into contact with the support surface P3 of the molding member 6. Here, in the same manner as embodiment 1, the contact pad 58 may be configured such that the contact surface P4 thereof is free to incline (free to swing) with respect to the linking shaft 57.

Here, in the plurality of height adjustment mechanisms 52, the interiors of a plurality of the containers 55 are connected with each other via a communication flow path 62. This may cause a fluid in the container 55 to flow out into another container 55 via the communication flow path 62, or may cause the fluid in another container 55 to flow into the container 55 via the communication flow path 62. This makes each of the interfaces of the fluids in the plurality of containers 55 to be a horizontal surface at the same level. Thus, since the floats 56 floating on the fluid in the plurality of containers 55 are at the same height, the plurality of height adjustment mechanisms 52 can bring the support surface P3 of the molding member 6 placed on the contact surfaces P4 of the plurality of contact pads 58 into a level surface.

According to the configuration of embodiment 2 above, since the interface of the fluid in the container 55 is a horizontal surface and the float 56 floats on the fluid which has the horizontal surface, the molding member 6 coming into contact with the contact pads 58 can be brought into a horizontal state. For this reason, since the interface of the fluid is a horizontal surface even in a case where the support frame 5 sags, it is possible for the height adjustment mechanisms 52 to support the molding member 6 to bring the molding member 6 into a horizontal state, which eliminates the need for an increase in the thickness of the molding member 6. This makes it possible to make the molding die 51 to be an inexpensive structure while suppressing deformation of the molding surface P2.

Here, in embodiment 2, a plurality of the height adjustment mechanisms 52 are provided; however, without being limited to this configuration, the height adjustment mechanism 52 may be configured as a single body. In this case, a single container 55 provided over the support frame 5 is formed in a large box shape so as to correspond to the shape of the support frame 5. In addition, a larger float 56 corresponding to the shape of the container 55 is floated on the fluid in the container 55. Then, the linking shaft 57 and the contact pad 58 are appropriately placed on the float 56 to be able to support the molding member 6.

Third Embodiment

Figure 8:
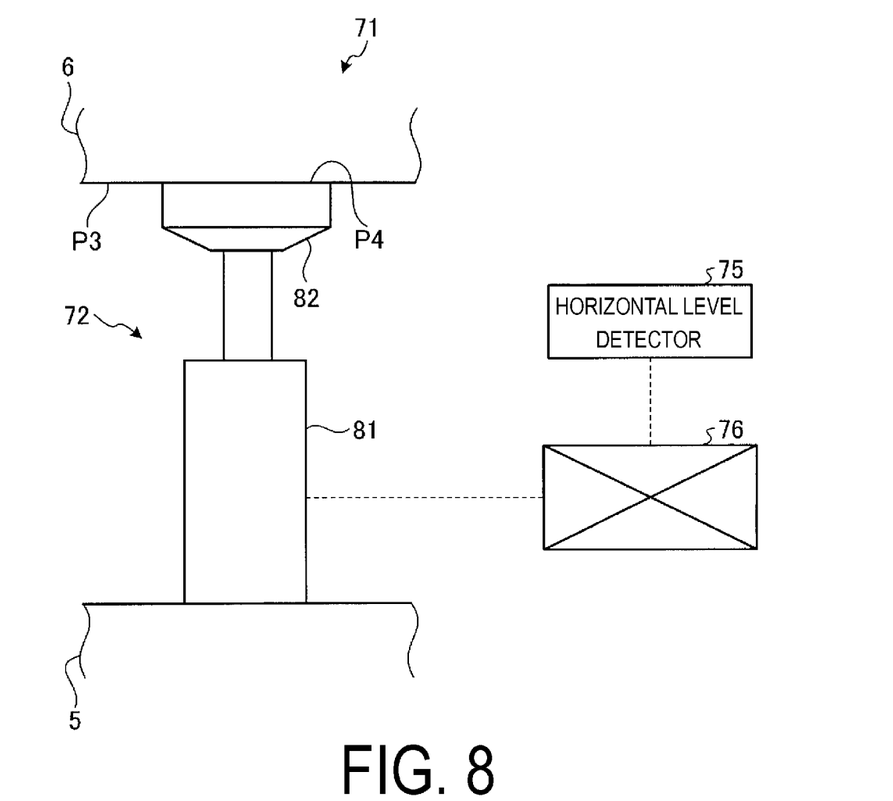
FIG. 8 is a schematic view illustrating a height adjustment mechanism of a molding die according to embodiment 3.

Next, description will be given of a molding die 71 according to embodiment 3 with reference to FIG. 8. FIG. 8 is a schematic view illustrating a height adjustment mechanism of a molding die according to embodiment 3. Here, also for embodiment 3, in order to avoid repeating the description in embodiment 1, description will be given of only of portions different from embodiment 1 and the same reference numerals will be used for the description of the same portions as embodiment 1. In embodiment 1, a screw mechanism is used as the height adjustment mechanism 7; however, in embodiment 3, a mechanism utilizing an actuator 81 is used as a height adjustment mechanism 72.

As illustrated in FIG. 8, the molding die 71 is further provided with a horizontal level detector 75 for detecting the horizontal level of the height adjustment mechanism 72, and a control unit 76 connected with the horizontal level detector 75. In addition, a plurality of the height adjustment mechanisms 72 are provided between the support frame 5 and the molding member 6. The plurality of height adjustment mechanisms 72 are arranged to be able to support the molding member 6 in the same manner as in embodiment 1.

Each of the height adjustment mechanisms 72 includes the actuator 81 and a contact pad 82. The actuator 81 has its leading end fixed to the contact pad 82 and moves the position of the contact pad 82 to a predetermined position in the height direction. As the actuator 81, for example, other than a hydraulic cylinder or pneumatic cylinder extending and retracting a piston, an electromagnetic solenoid extending and retracting a rod using electromagnetic force, or an electric actuator moving a screw shaft forward and backward by rotating a nut of a ball screw, which is formed of a screw shaft, a nut, and a ball, using a servo motor may be used, and any actuator may be used as long as it is possible to move the contact pad 82 to a predetermined position in the height direction. The actuator 81 is connected with the control unit 76 which controls the driving of the actuator 81. The contact pad 82 is fixed to the leading end of the actuator 81 and has the contact surface P4 coming into contact with the support surface P3 of the molding member 6. In the same manner as embodiment 1, the contact pad 82 may be configured such that the contact surface P4 thereof is free to incline (free to swing) with respect to the axial direction of the actuator 81.

Then, the control unit 76 controls the driving of a plurality of the actuators 81 of the plurality of the height adjustment mechanisms 72 to adjust each of the heights of the plurality of height adjustment mechanisms 72 on the basis of the detection results of the horizontal level detector 75, which makes it possible to bring the support surface P3 of the molding member 6 placed on the contact surface P4 of the plurality of contact pads 33 into a level surface.

According to the configuration of embodiment 3 above, the control unit 76 is capable of maintaining the horizontal level of the height adjustment mechanisms 72 by controlling the actuators 81 of the height adjustment mechanisms 72 on the basis of the detection results of the horizontal level detector 75. For this reason, even in a case where the support frame 5 sags under its own weight, the molding member 6 can be brought into a horizontal state by adjusting the heights of the height adjustment mechanisms 72 using the control unit 76. In addition, the height adjustment mechanisms 72 is capable of supporting the molding member 6 in a horizontal state, which eliminates the need for an increase in the thickness of the molding member 6. This makes it possible to make the molding die 71 to be an inexpensive structure while suppressing deformation of the molding surface P2.

REFERENCE SIGNS LIST

1 Molding die
5 Support frame
6 Molding member
7 Height adjustment mechanism
8 Wheel
10 Tail
13 Handle
15 Wing guide
16 Lay-up guide
21 Slit
22a, 22b Pin hole
25a, 25b Positioning pin
26a, 26b Positioning hole
31 Nut
32 Screw shaft
33 Contact pad
34 Lock nut
38 Auxiliary wheel
41 Upper skin
42 Lower skin
43 Front spar
44 Rear spar
45 Stringer
46 Rib
51 Molding die (embodiment 2)
52 Height adjustment mechanism (embodiment 2)
55 Container
56 Float
57 Linking shaft
58 Contact pad (embodiment 2)
61 Supporting member
62 Communication flow path
71 Molding die (embodiment 3)
72 Height adjustment mechanism (embodiment 3)
75 Horizontal level detector
76 Control unit
81 Actuator
82 Contact pad (embodiment 3)
P1 Floor surface
P2 Molding surface
P3 Support surface
P4 Contact surface

The invention claimed is:

1. A molding die used for molding a composite material, the molding die comprising:
   a molding member having a molding surface;
   a support frame provided on a lower side of the molding member, the support frame being configured to support the molding member; and
   a height adjustment mechanism provided between the molding member and the support frame, the height adjustment mechanism being capable of adjusting a height of the molding member with respect to the support frame;
   the height adjustment mechanism including:
   a nut configured to be fixed to the support frame,
   a screw shaft configured to be screwed into the nut at a lower end of the screw shaft and to be rotated to move in a height direction with respect to the nut, and
   a contact member with a contact surface provided on an upper end of the screw shaft, the contact surface of the contact member being configured to come into contact with a support surface of the molding member;
   the contact member being free to incline with respect to the screw shaft.

2. The molding die according to claim 1, the molding die further comprising:
   a guide member placed on the molding surface, the guide member being formed in a linear shape extending in a short-side direction of the molding surface and being flexible corresponding to the molding surface which is a curved surface; wherein the guide member includes:

a plurality of slits formed to be spaced at predetermined intervals in a longitudinal direction of the guide member so that a portion on the bottom surface side of the guide member is left and to extend in an orthogonal direction orthogonal to the longitudinal direction of the guide member, and a pin hole for fixing the guide member corresponding to the molding surface.

3. The molding die according to claim 1, wherein a thermal expansion coefficient of the molding member is less than or equal to a thermal expansion coefficient of the support frame.

4. The molding die according to claim 1, further comprising three wheels provided on a lower side of the support frame, the three wheels being configured to travel on a floor surface while supporting the support frame at three points.

* * * * *